(12) United States Patent
Kondapally et al.

(10) Patent No.: US 12,109,706 B2
(45) Date of Patent: Oct. 8, 2024

(54) CONTROL DEVICE, ROBOT SYSTEM, CONTROL METHOD, AND NON-TRANSITORY COMPUTER-READABLE MEDIUM

(71) Applicant: Honda Motor Co., Ltd., Tokyo (JP)

(72) Inventors: Anirudh Reddy Kondapally, Saitama (JP); Naoki Hosomi, Saitama (JP); Nanami Tsukamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 188 days.

(21) Appl. No.: 17/671,545

(22) Filed: Feb. 14, 2022

(65) Prior Publication Data

US 2022/0297296 A1  Sep. 22, 2022

(30) Foreign Application Priority Data

Mar. 22, 2021 (JP) ................................. 2021-047360

(51) Int. Cl.
*B25J 9/16* (2006.01)
(52) U.S. Cl.
CPC .................................... *B25J 9/1664* (2013.01)
(58) Field of Classification Search
None
See application file for complete search history.

(56) References Cited

U.S. PATENT DOCUMENTS

2019/0291277 A1  9/2019 Oleynik

FOREIGN PATENT DOCUMENTS

| CA | 3071332 A1 | * | 1/2019 | ............. B25J 9/162 |
|---|---|---|---|---|
| JP | 2017196678 | | 11/2017 | |
| JP | 6476358 | | 2/2019 | |
| WO | 2018212226 | | 11/2018 | |
| WO | WO-2018212226 A1 | * | 11/2018 | ............. B25J 13/08 |

OTHER PUBLICATIONS

Nguyen et al. "Trajectory Planning and Control of a Stewart Platform-Based End-Effector with Passive Compliance for Part Assembly" (Year: 1992).*
Wissing et al. "Adjustments in End-Effector Trajectory and Underlying Joint Angle Synergies after a Target Switch: Order of Adjustment is Flexible" (Year: 2020).*
"Office Action of Japan Counterpart Application", issued on Jul. 2, 2024, with English translation thereof, pp. 1-6.

* cited by examiner

*Primary Examiner* — Khoi H Tran
*Assistant Examiner* — Bryant Tang
(74) *Attorney, Agent, or Firm* — JCIPRNET

(57) ABSTRACT

A control device includes a target position setting part, a trajectory estimation part, and a target position selector. The target position setting part determines a target position of an actor of a robot based on a form of an object located in an operating environment of the robot. The trajectory estimation part estimates a predicted trajectory of the actor based on motion of the actor up to the present, and estimates a trajectory of the actor from a current position to the target position as an approach trajectory using a predetermined function. The target position selector selects one target position based on a degree of similarity between the predicted trajectory and each of the approach trajectory.

6 Claims, 5 Drawing Sheets

CONTROL DEVICE, ROBOT SYSTEM, CONTROL METHOD, AND NON-TRANSITORY COMPUTER-READABLE MEDIUM

CROSS-REFERENCE TO RELATED APPLICATIONS

This application claims the priority benefit of Japan Application No. 2021-047360, filed on Mar. 22, 2021. The entirety of the above-mentioned patent application is hereby incorporated by reference herein and made a part of this specification.

BACKGROUND

Technical Field

The disclosure relates to a control device, a robot system, a control method, and a program.

Related Art

Conventionally, a robot system has been proposed which receives an action from an operator and operates a robot in accordance with the received action. For example, in a robot system described in Patent Document 1, first user posture information indicating a posture of a first user who operates a robot is acquired, and posture-before-change information indicating the robot's previous posture before the posture is changed based on the first user posture information is acquired. In the robot system, based on the posture-before-change information, and the first user posture information at the moment when the robot is in the previous posture indicated by the posture-before-change information, the robot's posture is determined to be a target posture different from the posture of the first user.
Patent Document 1: Japanese Patent No. 6476358

When the operator operates the robot to perform work, it is necessary to bring the robot close to an object as an operation target. However, in the conventional robot system, the position of the object as the operation target has not been sufficiently considered. In addition, a delay may occur from when the operator performs an action to when the action is reflected in the robot's motion, or a difference may occur between the amount of action of the operator and the amount of motion of the robot. These have been factors that hinder operability.

SUMMARY

One aspect of the disclosure provides a control device including: a target position setting part, determining a target position of an actor of a robot based on a form of an object located in an operating environment of the robot; a trajectory estimation part, estimating a predicted trajectory of the actor based on motion of the actor up to the present, and estimating a trajectory of the actor from a current position to the target position as an approach trajectory using a predetermined function; and a target position selector, selecting one target position based on a degree of similarity between the predicted trajectory and each of the approach trajectory.

Another aspect of the disclosure provides a control method in a control device. The control method includes the following. A target position of an actor of a robot is determined based on a form of an object located in an operating environment of the robot. A predicted trajectory of the actor is estimated based on motion of the actor up to the present, and a trajectory of the actor from a current position to the target position is estimated as an approach trajectory using a predetermined function. One target position is selected based on a degree of similarity between the predicted trajectory and each of the approach trajectory.

DESCRIPTION OF THE EMBODIMENTS

Figure 1:
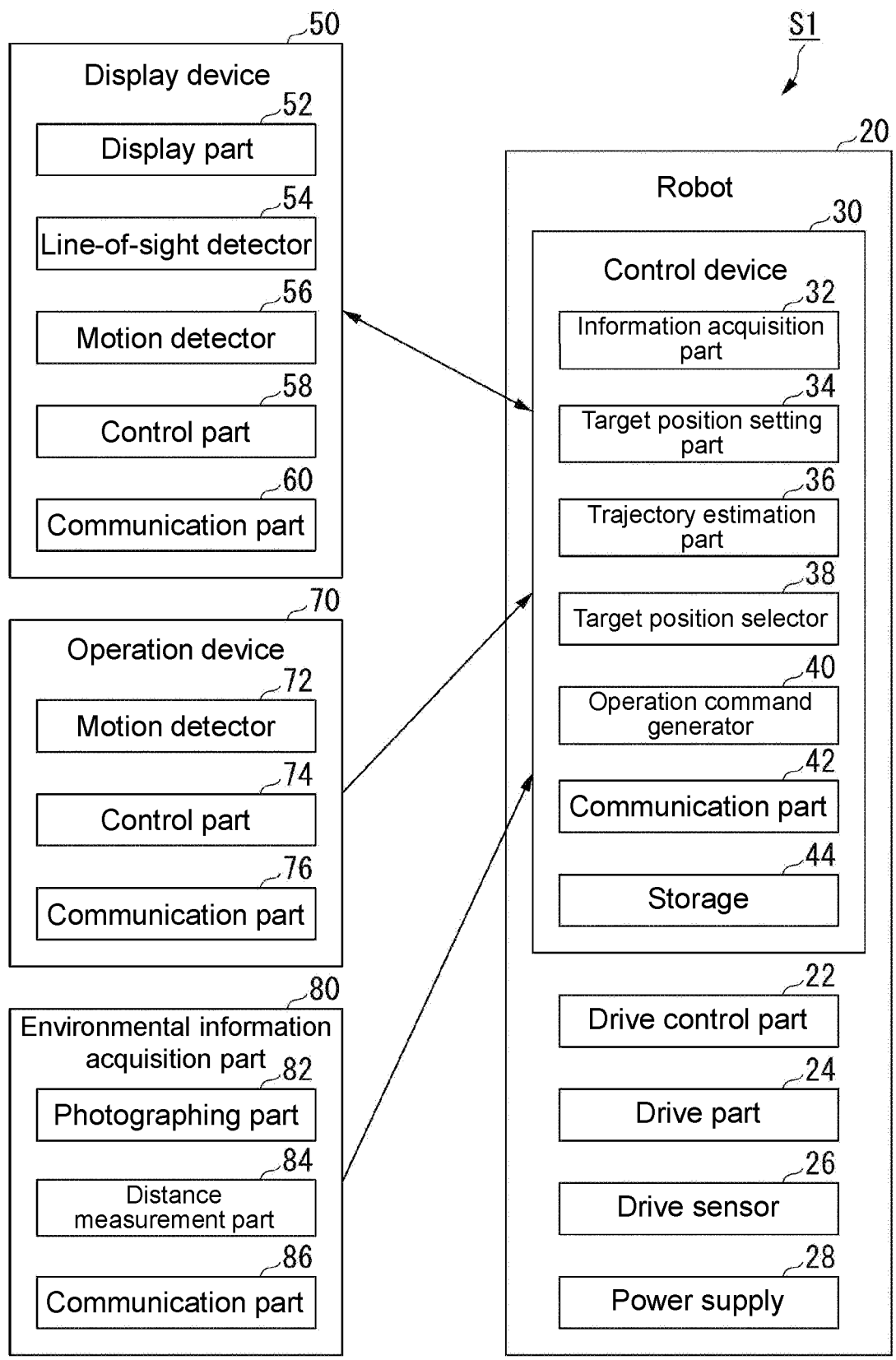
FIG. 1 is a schematic block diagram illustrating a configuration example of a robot system according to a first embodiment.

An aspect of the disclosure provides a control device, a robot system, a control method, and a program in which operability of a robot can be improved.

(1) One aspect of the disclosure provides a control device including: a target position setting part, determining a target position of an actor of a robot based on a form of an object located in an operating environment of the robot; a trajectory estimation part, estimating a predicted trajectory of the actor based on motion of the actor up to the present, and estimating a trajectory of the actor from a current position to the target position as an approach trajectory using a predetermined function; and a target position selector, selecting one target position based on a degree of similarity between the predicted trajectory and each of the approach trajectory.

(2) In another aspect of the disclosure, in the control device of (1), the target position setting part may determine a shape of the object from an image indicating the operating environment, and may, based on feature point data indicating an arrangement of feature points for each shape, determine a position of a feature point corresponding to the determined shape as the target position.

(3) In another aspect of the disclosure, in the control device of (2), the target position setting part may reject the target position that interferes with another object.

(4) In another aspect of the disclosure, in the control device of any one of (1) to (3), with respect to an object having dimensions larger than predetermined dimensions, the target position setting part may determine an intersection of a surface of the object and a line-of-sight direction of an operator based on line-of-sight information indicating the line-of-sight direction, and may determine the target position based on a distribution of the intersection.

(5) In another aspect of the disclosure, in the control device of (4), the target position setting part may classify the intersection into multiple clusters, and may determine a representative point of the distribution of the intersection of each cluster as the target position.

(6) Another aspect of the disclosure may provide a program for causing a computer to function as the control device of any one of (1) to (5).

(7) Another aspect of the disclosure may provide a robot system including the control device of any one of (1) to (5) and the robot.

(8) Another aspect of the disclosure provides a control method in a control device. The control method includes the following. A target position of an actor of a robot is determined based on a form of an object located in an operating environment of the robot. A predicted trajectory of the actor is estimated based on motion of the actor up to the present, and a trajectory of the actor from a current position to the target position is estimated as an approach trajectory using a predetermined function. One target position is selected based on a degree of similarity between the predicted trajectory and each of the approach trajectory.

According to the configurations of (1), (6), (7) and (8) above, the approach trajectory to the target position is set based on the shape of the object in the operating environment of the robot, and the target position is selected based on the degree of similarity between the predicted trajectory estimated from the motion of the actor and the approach trajectory. By guiding the actor of the robot to the target position where an intention of the operator is likely to be met, operability of the robot can be improved. Since such processing is based on the target position determined based on the motion of the actor up to the present and the form of the object in the operating environment, it does not depend on the type of task. Hence, the disclosure is applicable to a scenario of approaching the object regardless of the type of task.

According to the above-described configuration of (2), the position of the feature point corresponding to the shape of the object determined from the image indicating the operating environment is determined as the target position. The actor of the robot can be guided by setting the position of a typical feature point as the target position according to the shape of the object.

According to the above-described configuration of (3), since invalid target positions that the actor is unable to approach are removed, the actor can be relatively reliably moved.

According to the above-described configuration of (4), a position gazed by the operator is determined as the target position. Therefore, even if the object is a large object in which a feature point cannot be uniquely determined, the motion of the actor can be guided to an object of interest and a position of interest to the operator.

According to the above-described configuration of (5), even if the position gazed by the operator is distributed in a discrete manner, the target position corresponding to each distribution is determined. By guiding the actor of the robot to a position of interest to the operator, the operability can be improved.

First Embodiment

Hereinafter, a first embodiment of the disclosure is described with reference to the drawings.

FIG. 1 is a schematic block diagram illustrating a configuration example of a robot system S1 according to the present embodiment.

The robot system S1 is a control system able to control a motion of a robot 20 in accordance with an action of an operator.

The robot system S1 is a manipulation system that manipulates the motion of the robot 20 in response to an operation. The robot system S1 detects an action of the operator and causes the robot 20 to perform a motion corresponding to the detected action. The robot 20 includes an end effector (also referred to a robot hand, an actor, or the like). The end effector is a member that mechanically acts on and affects another object. The end effector has multiple fingers and includes a mechanism able to hold or release another object. Each individual finger is able to operate in response to a motion of a corresponding finger of the operator. Accordingly, various works are realized.

The robot system S1 determines multiple target positions of the end effector based on environmental information indicating a condition of an operating environment of the robot 20. The target position is a position set as a target when the end effector is to be moved, and is also referred to as an approach point. The robot system S1 estimates a predicted trajectory of the end effector based on motion of the end effector up to the present. On the other hand, the robot system S1 estimates a trajectory from a current position of the end effector to each individual target position as an approach trajectory using a predetermined function. The robot system S1 selects a target position corresponding to one approach trajectory based on a degree of similarity between the predicted trajectory and each approach trajectory. The robot system S1 moves the robot 20 toward the selected target position.

The robot system S1 includes the robot 20, a display device 50, an operation device 70, and an environmental information acquisition part 80. The robot 20 includes one or more manipulators. The manipulator is also referred to as a robot arm. Each individual manipulator has multiple segments that are interconnected. One end effector is provided for multiple segments. The end effector is a member that is connected to one end of the manipulator and contacts and acts on an object. The robot 20 includes a joint for each segment pair including two segments, and includes an actuator for each joint. By changing an angle formed between each two segments by the actuator, the position of the end effector can be moved. The following description mainly describes a case (single arm type) where the number of the manipulators is one. However, the number may be two or more. The robot 20 may be a stationary type fixed at a predetermined position or a movable type able to move its position.

The control device 30 of the robot 20 is connected to the display device 50, the operation device 70, and the environmental information acquisition part 80 wirelessly or by wire so as to be able to input and output various information.

The display device 50 and the operation device 70 may be located in a space physically separated from the robot 20 and the environmental information acquisition part 80. In that case, the display device 50 and the operation device 70 may be connected to the control device 30 via a communication network (remote operation system).

The robot 20 includes a drive control part 22, a drive part 24, a drive sensor 26, a power supply 28, and the control device 30.

The drive control part 22 determines a drive command based on a control command input from the control device 30 and drive state information acquired from the drive sensor 26. More specifically, the drive control part 22 determines the drive command indicating a driving force (torque) of each actuator as an operation amount so as to reduce a difference between the target position set as a control target indicated by the control command and the position of the end effector. Based on the angle formed by two segments at each individual joint and the size of each individual segment indicated in the drive state information, the drive control part 22 is able to determine the position of the end effector as an output value by the drive part 24. The drive control part 22 outputs the determined drive command to the drive part 24. The drive control part 22 is configured to include, for example, a proportional-differential (PD) controller or a proportional-integral-differential (PID) controller, as a controller that determines the operation amount so as to reduce a difference between an output value indicating a state of a control object and the control target.

The drive part 24 includes an actuator for each joint and operates in accordance with the drive command input from the drive control part 22. Each individual actuator corresponds to a so-called motor, and changes the angle formed by two segments connected to its own unit in accordance with a drive amount instructed by the drive command.

The drive sensor 26 detects a drive state of the robot 20 driven by the drive part 24, and outputs the drive state information indicating the detected drive state to the drive control part 22 and the control device 30. The drive sensor 26 is configured to include, for example, a rotary encoder that detects the angle formed by two segments for each joint.

The power supply 28 supplies electric power to each component provided in the robot 20. The power supply 28 includes, for example, a power supply terminal, a secondary battery, and a voltage converter. The power supply terminal allows connection to a power line, is supplied with electric power from the outside, and supplies the supplied electric power to the secondary battery or the voltage converter.

The secondary battery stores the electric power supplied using the power supply terminal. The secondary battery makes it possible to supply electric power to each component via the voltage converter. The voltage converter converts the voltage of the electric power supplied from the power supply terminal or the secondary battery into a predetermined voltage required by each component, and supplies the electric power whose voltage has been converted to each component.

The control device 30 includes an information acquisition part 32, a target position setting part 34, a trajectory estimation part 36, a target position selector 38, an operation command generator 40, a communication part 42, and a storage 44.

The information acquisition part 32 acquires various information relating to a condition of the operator and a condition of the robot 20. For example, the information acquisition part 32 acquires line-of-sight information and first operator motion information from the display device 50. The line-of-sight information is information indicating a line-of-sight direction of at least one eye of the operator at a certain time. The first operator motion information is information indicating a motion of the operator's head. The motion of the head is expressed by the direction and position of the head at each time.

The information acquisition part 32 acquires second operator motion information from the operation device 70. The second operator motion information is information indicating a body motion pertaining to an operation performed by the operator. The second operator motion information includes information mainly indicating a motion of the hand as a body part of the operator. The motion of the body part is expressed using information about the position of the body part at each time.

The information acquisition part 32 acquires the environmental information from the environmental information acquisition part 80. The environmental information indicates the operating environment of the robot 20. The environmental information includes image data indicating an image indicating the operating environment of the robot 20 and distance data indicating a distance to an object distributed in the operating environment of the robot 20.

The information acquisition part 32 acquires the drive state information from the drive sensor 26. The information acquisition part 32 stores acquired various information in the storage 44.

Figure 3:
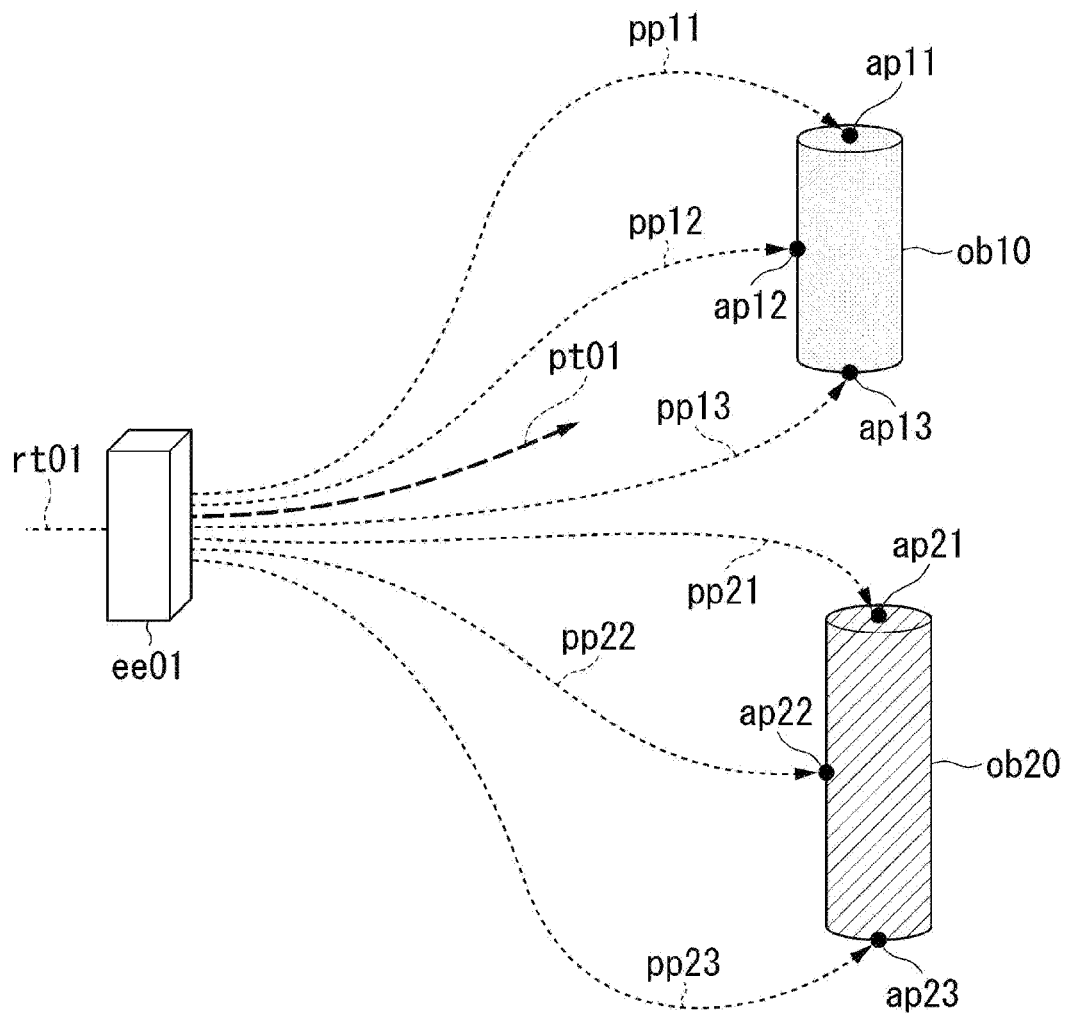
FIG. 3 is an explanatory diagram illustrating an example of a target position, a predicated trajectory and an approach trajectory according to the first embodiment.

The target position setting part 34 reads the latest environmental information at that moment from the storage 44, and determines the target position based on the read environmental information. The target position is a position to which the end effector may be moved. The target position is a candidate for a position where the end effector acts on the object. As the target position, a typical position where an action on the object is made according to shape characteristics of the object may be adopted. The target position may be, for example, a position where the end effector is able to easily approach and stably hold the object. The target position setting part 34 identifies an object disposed in the operating environment of the robot 20 based on the image data and the distance data indicated by the environmental information, and recognizes a region occupied by each individual object. The target position setting part 34 is able to use known image recognition processing when recognizing the region of each individual object. The target position setting part 34, for example, extracts a spatially continuous region occupied by each individual object from a surface shape in a three-dimensional space indicated by the image data and the distance data with reference to object model data. In the example illustrated in FIG. 3, the target position setting part 34 specifies regions of two objects ob10 and ob20 using the image data and the distance data. The object model data is obtained by setting in advance information indicating a three-dimensional region of each object. The object model data is stored in advance in the storage 44.

The target position setting part 34 determines a shape with respect to the recognized region of each individual object. The target position setting part 34 is able to use known image recognition processing when determining the shape of the region of the object. The target position setting part 34, for example, determines the shape to which the shape characteristics of the determined region are most approximate to with reference to shape model data. The shape model data is obtained by setting in advance information indicating the shape characteristics of each shape. In the example illustrated in FIG. 3, both the objects ob10 and ob20 have a region having the shape characteristics that a line segment having a finite length has axial symmetry as an axis, a section orthogonal to the axis has a substantially circular shape and the area of the section is substantially constant regardless of the position of the section on the axis. Hence, the target position setting part 34 is able to determine that the shape of each of the objects ob10 and ob20 is a column. With respect to a region having the shape characteristics that one side is provided longer than the other two sides, a section orthogonal to the direction of the one side has a substantially triangular shape, and the section becomes smaller as the position of the section is closer to a surface rather than a bottom surface, the target position setting part 34 is able to determine the shape of the region to be a truncated triangular pyramid. The shape model data indicating the shape characteristics of each shape is stored in advance in the storage 44.

The target position setting part 34 determines a feature point corresponding to the determined shape of the region. The target position setting part 34, for example, determines a position of the feature point corresponding to the determined shape with reference to feature point data, and determines the determined position as the target position. The feature point data is obtained by setting in advance information indicating an arrangement of typical feature points of each shape. As the feature point, a position where there is a possibility of performing work by the end effector based on experience is set in advance. The feature point may be set at a vertex or an edge of an object. The feature point data is stored in advance in the storage 44. For example, for a vertically long column whose height is greater than its diameter, among the center of a bottom surface, the center of a surface, and a cross section of a midpoint in the height direction, the target position setting part 34 is able to determine a position that is closest to the end effector as the target position. In the example illustrated in FIG. 3, the target position setting part 34 is able to determine the center of a surface of the object ob10, a point on a cross section of the object ob10 that is closest to an end effector ee01, and the center of a bottom surface of the object ob10 as a target position ap11, a target position ap12 and a target position ap13, respectively. For the object ob20, the center of a surface thereof, a point on a cross section thereof that is closest to the end effector ee01, and the center of a bottom surface thereof are determined as a target position ap21, a target position ap22, and a target position ap23, respectively. The number of the target positions determined in this manner may usually be two or more. The shape is not limited to column, and the feature point may be similarly set for shapes such as truncated cone, prism, and pyramid.

However, the target position setting part 34 may reject a target position that interferes with another object. Interference with another object means that the end effector is unable to approach the target position without contacting another object. For example, the target position may be covered by another object, or there may not be sufficient space around the target position to dispose the end effector. For example, if the objects ob10 and ob20 are respectively provided on bases with their respective bottom surfaces in contact with the bases without being exposed, the end effector ee01 is unable to approach the respective bottom surfaces. In that case, the target position setting part 34 excludes the target positions ap13 and ap23 set on the respective bottom surfaces of the objects ob10 and ob20 from the target positions. The target position setting part 34 stores the target position information indicating the determined target position in the storage 44.

The trajectory estimation part 36 reads the drive state information stored in the storage 44, and, based on the angle of each joint and dimensions of each segment indicated by the drive state information, calculates the position of the end effector at that moment. The trajectory estimation part 36 generates a trajectory indicating the position at each time within a predetermined period up to the present as a performance trajectory. The trajectory estimation part 36 performs known regression analysis and applies the position at each time that constitutes the performance trajectory to a predetermined continuous function that is time dependent. The trajectory estimation part 36 is able to use, for example, the least squares method in application to the continuous function. As the predetermined continuous function, for example, a quadratic function or a third- or higher-order function that is time dependent, may be used. The trajectory estimation part 36 extrapolates the performance trajectory using the determined continuous function, and determines the predicted trajectory indicating the position at each time from the present until a predetermined time later. In the example illustrated in FIG. 3, a performance trajectory rt01 of the end effector ee01 up to the present is extrapolated and a predicted trajectory pt01 is estimated.

The trajectory estimation part 36 may extrapolate the angle of each joint at each time indicated by the drive state information using a predetermined second continuous function that is time dependent and determine the angle at each time from the present until the predetermined time later. The trajectory estimation part 36 may determine the position at each time based on the determined angle and the size of the segment. The second continuous function is, for example, a quadratic function or a third- or higher-order function that is time dependent. The trajectory estimation part 36 stores predicted trajectory information indicating the determined predicted trajectory in the storage 44.

On the other hand, the trajectory estimation part 36 reads the target position information from the storage 44, and, from the position (sometimes referred to as "current position" herein) of the end effector at the present for each target position indicated by the read target position information, determines a trajectory to the target position as the approach trajectory using a predetermined interpolation method. The trajectory estimation part 36 is able to use an interpolation method such as, for example, spline interpolation. In the spline interpolation, a spline curve such as, for example, a cubic or higher-order spline curve or a non-uniform rational B-spline (NURBS) curve, may be used.

In the case of using a high-order spline curve, the trajectory estimation part 36, for example, determines a parameter of the curve so that the angles and angular velocities are continuous with respect to each joint of the robot for each individual division point dividing a section from the current position to the target position into multiple subsections. The number of the subsections is set in advance in the trajectory estimation part 36. The position of the end effector is determined using the angle of each joint and the dimensions of the segment. In the case of using an NURBS curve, the trajectory estimation part 36, for example, determine a parameter of the curve so that the angles and angular velocities are continuous with respect to each joint of the robot 20 for each plurality of control points. The control points do not necessarily pass through the trajectory. The number of the control points is set in advance. In the example illustrated in FIG. 3, as the approach trajectories respectively corresponding to the target positions ap11, ap12, ap13, ap21, ap22, and ap23, approach trajectories pp11, pp12, pp13, pp21, pp22, and pp23 are determined.

The trajectory estimation part 36 may use a relaxation curve instead of the spline curve. The relaxation curve is a curve in which the curvature at the current position is set to 0 and the curvature varies continuously. As the relaxation curve, for example, a clothoid curve may be used. The clothoid curve is a locus obtained by changing the curvature at a constant rate. In the clothoid curve, the product of the radius of curvature and the length of the locus is constant. In trajectory estimation, the trajectory estimation part 36 may impose a constraint condition that the velocity at the target position is zero or the angular velocity at each joint is zero. Since the velocity at which the end effector reaches the target position can be approximated to zero, an impact that may occur when the end effector comes into contact with the object can be avoided or mitigated.

The trajectory estimation part 36 stores approach trajectory information indicating the approach trajectory determined for each target position in the storage 44. The trajectory may be expressed by a parameter of a curve indicating the position of the end effector at each time, or by the position of the end effector at each time until reaching the target position, or by the angle of each joint of the robot 20 at each time.

The target position selector 38 reads the predicted trajectory information and the approach trajectory information from the storage 44. In the case where the approach trajectory information indicates two or more approach trajectories, the target position selector 38 calculates a degree of similarity between the predicted trajectory indicated by the predicted trajectory information and each individual approach trajectory indicated by the approach trajectory information. Here, a degree of approximation between a first distribution of positions at each time later than the present as a set of positions constituting the predicted trajectory and a second distribution of positions at each corresponding time as a set of positions constituting one approach trajectory is evaluated as the degree of similarity. As an index value of the degree of similarity, an index value quantitatively indicating two distributions may be used. For example, the Bhattacharyya distance is applicable as such an index value. The Bhattacharyya distance is an index value that increases as the degree of similarity between the two distributions decreases. However, the index value is not limited thereto, and the Wasserstein distance or the like may be used. The target position selector 38 specifies the approach trajectory that gives a highest degree of similarity among the degrees of similarity calculated for each approach trajectory. The target position selector 38 selects the target position corresponding to the specified approach trajectory, and stores the target position information indicating the selected target position in the storage 44. In the example illustrated in FIG. 3, the approach trajectory pp12 is selected as the approach trajectory that most approximates the predicted trajectory pt01. Thus, the target position ap12 corresponding to the approach trajectory pp12 is specified.

In the case where the approach trajectory information indicates one approach trajectory, the target position selector 38 may adopt the target position corresponding to the one approach trajectory indicated by the approach trajectory information as it is. The target position selector 38 stores the target position information indicating the adopted target position in the storage 44.

If no approach trajectory is specified, the target position selector 38 may determine a position corresponding to the position of the hand indicated by the latest second operator motion information stored in the storage 44 as the target position by coordinate conversion. In the coordinate conversion, a coordinate value in an operator coordinate system that indicates the position indicated by the second operator motion information is converted into a coordinate value in a robot coordinate system. The operator coordinate system is a coordinate system based on the position and orientation of the operator. The robot coordinate system is a coordinate system based on the position and orientation of the robot 20.

The operation command generator 40 reads the target position information from the storage 44, and generates an operation command for moving the end effector from the current position to the target position indicated by the read target position information. The operation command generator 40, for example, reads the drive state information stored in the storage 44, performs known inverse kinematics analysis and known inverse dynamics analysis based on a current operation condition (angle of each joint) and the moment of inertia of each segment indicated by the drive state information, and determines a driving force (torque) at each joint for moving the end effector to the target position. The operation command generator 40 outputs the operation command indicating the determined driving force at each joint to the drive control part 22.

The communication part 42 transmits and receives various information wirelessly or by wire between each component of the robot 20 and another component (that is, the display device 50, the operation device 70, and the environmental information acquisition part 80). The communication part 42 is configured to include, for example, an input/output interface and a communication interface.

The storage 44 temporarily or permanently stores data used for various processings in the control device 30, various data acquired by the control device 30, or the like. The storage 44 is configured to include, for example, a storage medium such as a random access memory (RAM) and a read only memory (ROM).

The display device 50 is configured to include a display part 52, a line-of-sight detector 54, a motion detector 56, a control part 58, and a communication part 60. The display device 50 may include a support member that can be mounted on the head of the operator being a user, and may be configured as a head mounted display (HMD).

The display part 52 receives the image data from the environmental information acquisition part 80 via the control device 30 using the communication part 60. Based on the received image data, the display part 52 displays the image indicating the operating environment of the robot 20. When the display part 52 is mounted on the operator's head, the display part 52 may be disposed in a position where a screen thereof faces the front of both eyes.

The line-of-sight detector 54 is configured to include a line-of-sight sensor detecting the line-of-sight direction of both eyes of the operator. The line-of-sight detector 54 transmits the line-of-sight information indicating the line-of-sight direction detected at each time to the control device 30 using the communication part 60. When the line-of-sight detector 54 is mounted on the operator's head, the line-of-sight detector 54 may be disposed in a position exposed to at least one of the eyes.

The motion detector 56 detects the motion of the operator's head, and transmits the first operator motion information indicating the detected motion to the control device 30 using the communication part 60. The motion detector 56 is configured to include, for example, an acceleration sensor for detecting the motion of the operator.

The control part 58 controls a function of the display device 50. The control part 58 is configured to include a processor such as a central processing unit (CPU).

The communication part 60 transmits and receives various information to and from the control device 30. The communication part 60 is configured to include a communication interface.

The operation device 70 includes a motion detector 72, a control part 74, and a communication part 76. The operation device 70 may include a support member that can be mounted on the hand of the operator being a user, and may be configured as a data glove.

The motion detector 72 detects the motion of the operator's hand, and transmits the second operator motion information indicating the detected motion to the control device 30 using the communication part 76. The motion detector 72 is configured to include, for example, an acceleration sensor for detecting the motion of the operator's hand.

The control part 74 controls a function of the operation device 70. The control part 74 is configured to include a processor such as a CPU.

The communication part 76 transmits and receives various information to and from the control device 30. The communication part 76 is configured to include a communication interface.

The motion detector 72 may be connected to the communication part 60 of the display device 50, and may transmit the second operator motion information to the control device 30 via the communication part 60. In that case, the control part 74 and the communication part 76 may be omitted.

The environmental information acquisition part 80 includes a photographing part 82, a distance measurement part 84, and a communication part 86. The environmental information acquisition part 80 may be provided in a housing of the robot 20 or may be provided in a separate position from the robot 20.

The photographing part 82 captures an image in the operating environment within a predetermined range from the robot 20. The operating environment includes a range that can be reached by the end effector of the robot 20. The captured image does not necessarily include the whole of the image of the robot 20. The photographing part 82 is a digital video camera that captures an image at predetermined time intervals. The photographing part 82 transmits the image data indicating the captured image to the control device 30 via the communication part 86.

The distance measurement part 84 measures a distance to a surface of an object in the operating environment within a predetermined range from the robot 20. The distance measurement part 84 includes, for example, a wave transmitter, a wave receiver, and a distance detector. The wave transmitter transmits a wave motion such as an infrared ray. The wave transmitter is configured to include, for example, a light emitting diode. The wave receiver receives a reflected wave generated by reflection on the surface of the object. The wave receiver is configured to include, for example, a photodiode. The reflected wave is generated in response to the wave motion transmitted from the wave transmitter being incident on the surface of the object as an incident wave. The distance detector is able to detect a phase difference between a transmitted wave and a reflected wave and determine a distance to the surface of the object based on the detected phase difference. The distance detector transmits the distance data indicating a distance determined for each direction corresponding to each pixel of an image to the control device 30 via the communication part 86. The wave motion used for distance measurement is not limited to an infrared ray, and may be a millimeter wave, an ultrasonic wave or the like.

The communication part 86 transmits and receives various information to and from the control device 30. The communication part 86 is configured to include a communication interface.

If the environmental information acquisition part 80 is provided in the housing of the robot 20 and is able to transmit and receive various information to and from another functional part of the robot 20, the communication part 86 may be omitted.

Hardware Configuration

Next, a hardware configuration example of the control device 30 according to the present embodiment is described.

Figure 2:
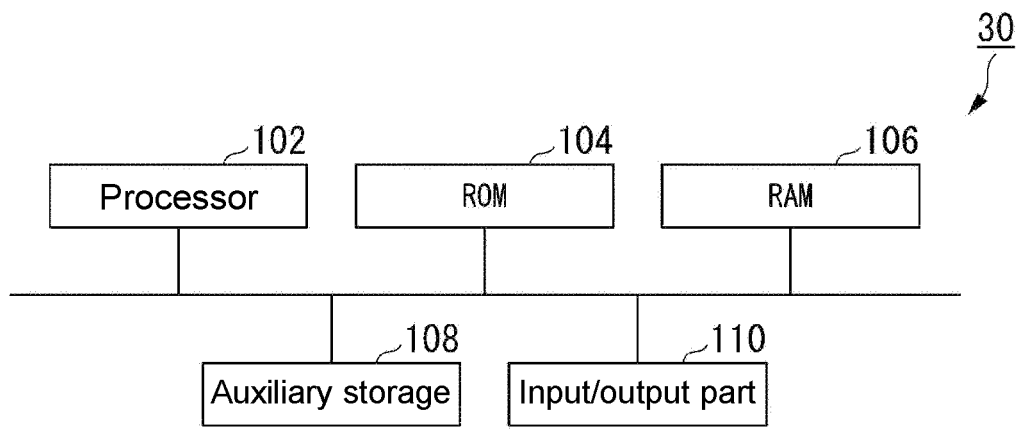
FIG. 2 is a schematic block diagram illustrating a hardware configuration example of a control device according to the first embodiment.

FIG. 2 is a schematic block diagram illustrating a hardware configuration example of the control device 30 according to the present embodiment. The control device 30 functions as a computer configured to include a processor 102, a ROM 104, a RAM 106, an auxiliary storage 108, and an input/output part 110. The processor 102, the ROM 104, the RAM 106, the auxiliary storage 108 and the input/output part 110 are connected so as to be able to input and output various data to and from each other.

The processor 102 reads, for example, a program or various data stored in the ROM 104, executes the program, and executes processing for realizing a function of each part of the control device 30 and processing for controlling the function. The processor 102 is, for example, a CPU.

Herein, executing processing instructed by various commands described in a program may be referred to as "execution of the program" or "executing the program".

The ROM 104 stores, for example, a program for being executed by the processor 102.

The RAM 106 functions as a work area temporarily storing, for example, various data and programs used by the processor 102.

The auxiliary storage 108 permanently stores various data. The data acquired by the control device 30 are stored in the auxiliary storage 108. The auxiliary storage 108 is a storage medium such as for example, a hard disk drive (HDD) or a solid state drive (SSD).

The input/output part 110, for example, is able to input and output various data with another device wirelessly or by wire. The input/output part 110 may be connected to another device via a network. The input/output part 110 includes, for example, one or both of an input/output interface and a communication interface.

The display device 50, the operation device 70 and the environmental information acquisition part 80 may include the same hardware configurations as those in FIG. 2 and may be configured as computers realizing the function of each device.

Motion Control Processing

Figure 4:
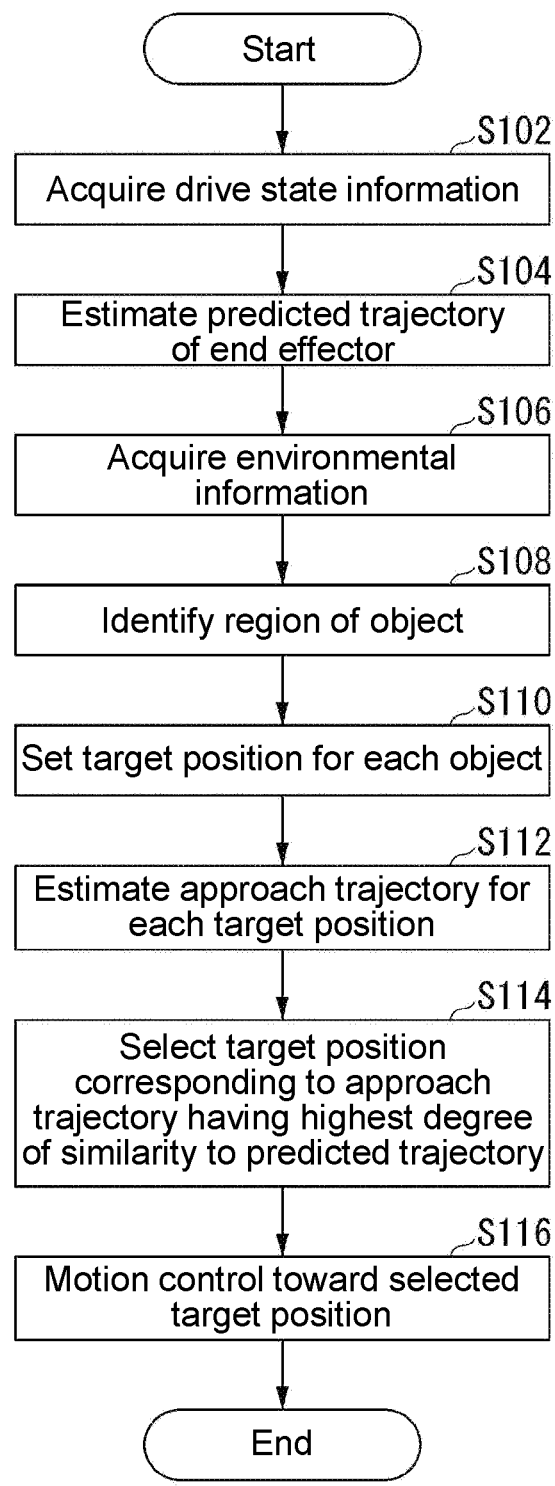
FIG. 4 is a flowchart illustrating an example of motion control processing according to the first embodiment.

Next, an example of motion control processing according to the present embodiment is described. FIG. 4 is a flowchart illustrating an example of motion control processing according to the present embodiment.

(Step S102) The information acquisition part 32 acquires the drive state information from the drive sensor 26.

(Step S104) The trajectory estimation part 36 calculates a position of an end effector based on an angle of each joint indicated by the drive state information. The trajectory estimation part 36 applies a performance trajectory being a trajectory of the position of the end effector up to the present to a predetermined continuous function. The target position setting part 34 estimates a predicted trajectory of the position at each time in the future until a predetermined time later using the applied continuous function.

(Step S106) The information acquisition part 32 acquires, from the environmental information acquisition part 80, the image data and the distance data as the environmental information indicating the operating environment of the robot 20.

(Step S108) The target position setting part 34 performs known image recognition processing from a surface shape in the operating environment indicated by the image data and the distance data, and identifies a region of each individual object.

(Step S110) The target position setting part 34 performs known image recognition processing and determines a shape of each individual object. The target position setting part 34 sets, as a target position, a position of a feature point corresponding to the determined shape with reference to the object model data set in advance.

(Step S112) For each estimated target position, the trajectory estimation part 36 estimates a trajectory from a current position of the end effector to the target position as an approach trajectory using a predetermined interpolation method.

(Step S114) The target position selector 38 calculates an index value indicating a degree of similarity to the predicted trajectory for each estimated approach trajectory. The target position selector 38 specifies the approach trajectory that gives the index value indicating a highest degree of similarity, and selects the target position corresponding to the specified approach trajectory.

(Step S116) The operation command generator 40 generates an operation command for moving the end effector to the selected target position, and outputs the generated operation command to the drive control part 22. Accordingly, the end effector is operated toward the target position. After that, the processing illustrated in FIG. 4 is ended.

Second Embodiment

Next, a second embodiment of the disclosure is described. The following description mainly describes the differences from the first embodiment. Regarding the functions and configurations common to the first embodiment, the description pertaining to the first embodiment will apply unless otherwise specified. The robot system S1 according to the present embodiment may have the same configuration as that illustrated in FIG. 1.

Generally, in the operating environment of the robot 20, there may be an object having dimensions larger than predetermined dimensions. The object includes a surface having dimensions sufficiently larger than a diameter of a typical end effector such as a desk, a table, or a base. On such a surface, a position where the operator causes the end effector to act is arbitrarily determined. Hence, the position where the end effector acts is not necessarily constant. Even if a feature point is set in advance, the position may not be a valid target position. Accordingly, in the present embodiment, the target position setting part 34 may determine whether a detected region of an object has dimensions larger than a threshold of the predetermined dimensions. In the target position setting part 34, a size that allows holding by the end effector may be set as the threshold of the predetermined dimensions. The target position setting part 34 may, based on whether the recognized region of the object has dimensions (for example, at least one of width, thickness, and height) that allow holding by the end effector, determine whether the detected region of the object has dimensions larger than the threshold of the predetermined dimensions.

With respect to the object determined to have dimensions larger than the threshold of the predetermined dimensions, the target position setting part 34 determines the target position based on the line-of-sight information. The target position setting part 34 reads the line-of-sight information from the storage 44, and determines an intersection of the line-of-sight direction from a central part of an eyeball (or the head) at each time within a predetermined period (for example, 1 to 60 seconds) up to the present indicated by the line-of-sight information and the object as an attention point of the operator. The target position setting part 34 determines a representative point of coordinates of the attention point determined with respect to each time as the target position.

The representative point may be any of the center of gravity, the most frequent point or the like if it is a position that statistically represents the attention point within the predetermined period. In the example illustrated in FIG. 5, unlike an object ob32 and an object ob34, a working stand wst30 is determined as an object having dimensions larger than the threshold of the predetermined dimensions. An intersection is with a surface of the working stand wst30 is determined for each individual line-of-sight direction. A representative point of the distribution of these intersections is is determined as a target position ap30. The target position setting part 34 may determine a position indicated by a coordinate value obtained by weighted averaging the coordinate values of each individual attention point as the target position. A weighting coefficient used for weighted averaging may be set to a real number that increases in the line-of-sight direction pertaining to a time close to the present. The newer the line-of-sight direction, the more emphasis is put on the target position and the target position is determined.

However, if an observed line-of-sight direction is based on a direction (hereinafter referred to as "head direction") of the operator's head, the line-of-sight direction is corrected using the head position and the head direction. The target position setting part 34 reads the first operator motion information from the storage 44, and converts the position and direction of the operator's head at each time indicated by the read first operator motion information into the robot coordinate system. The target position setting part 34 corrects the line-of-sight direction using the head position and the head direction after conversion, and determines the attention point using the line-of-sight direction after correction.

Figure 5:
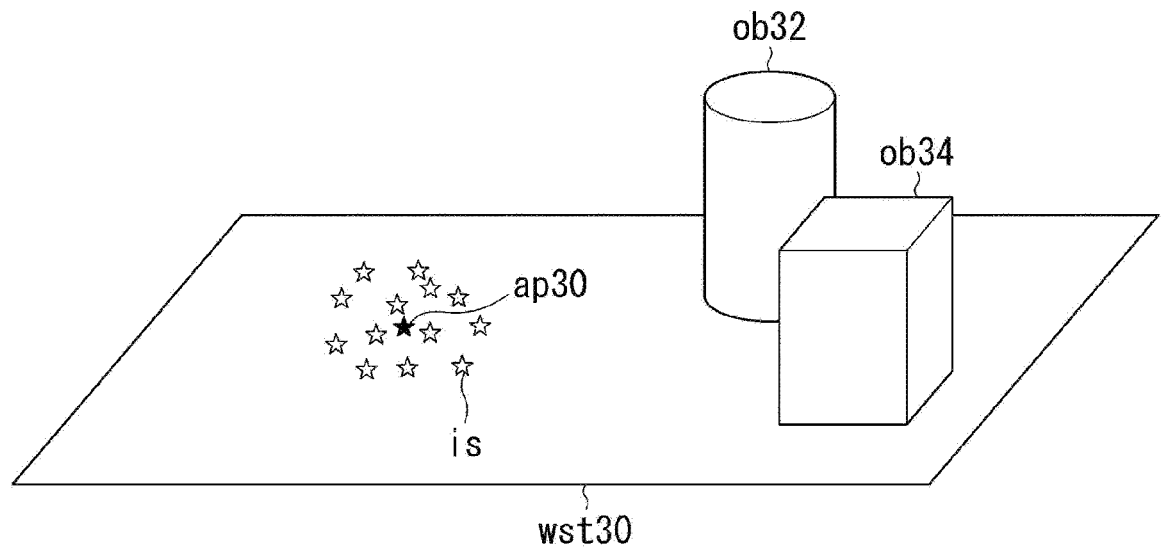
FIG. 5 is an explanatory diagram illustrating a setting example of a target position according to a second embodiment.
Figure 6:
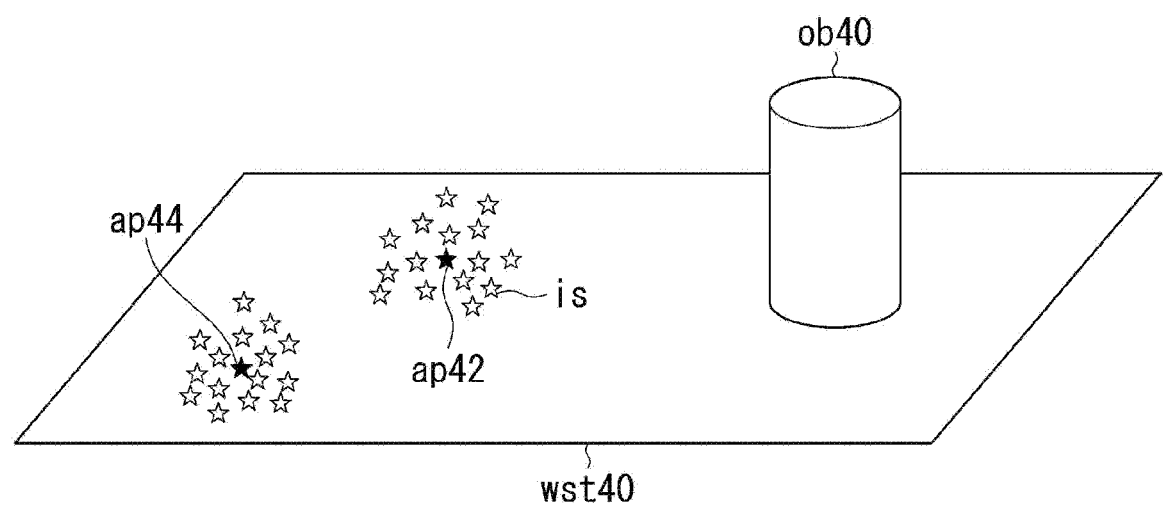
FIG. 6 is an explanatory diagram illustrating another setting example of a target position according to the second embodiment.

In the example illustrated in FIG. 5, the intersections is are distributed about the representative point thereof. However, the disclosure is not limited thereto. As illustrated in FIG. 6, the intersections is may be distributed into multiple subsets (clusters). In such a case, the operator is not necessarily interested in a representative point of the overall distribution of the intersections is.

The target position setting part 34 performs known clustering on the distribution of the attention point determined with respect to each time and classifies the attention point into multiple clusters. The target position setting part 34 is able to use, for example, k-means. k-means is a type of non-hierarchical clustering.

k-means is a method including each of the following steps (1a) to (1d): (1a) initialization, (1b) cluster center determination, (1c) reassignment, and (1d) convergence determination. In the (1a) initialization, the target position setting part 34 randomly assigns each attention point to any of a predetermined number k (k is an integer of 2 or more) of clusters. In the (1b) cluster center determination, the target position setting part 34 determines a calculated average value of the coordinates of each individual attention point for each cluster as a center value of the cluster. In the (1c) reassignment, the target position setting part 34 obtains a distance between a coordinate value of each individual attention point and the center value of each cluster, and assigns the attention point to the cluster with the shortest distance to the center value. In the (1d) convergence determination, the target position setting part 34 determines whether convergence has been reached based on whether the assignment to the cluster has not changed or whether the number of changes in the cluster is equal to or less than a predetermined number. The target position setting part 34 repeats the processing of (1b) and (1c) until it is determined that convergence is reached in the (d) convergence determination.

In the example illustrated in FIG. 6, the intersection is with a surface of a working stand wst40 is determined for each individual line-of-sight direction. Clustering is performed on the distribution of these intersections is, and the intersections is are classified into two clusters. The representative points of each cluster are determined as a target position ap42 and a target position ap44, respectively. In this case, the target position setting part 34 may also determine a position indicated by a coordinate value obtained by weighted averaging the coordinate values of each individual attention point as the target position. The weighting coefficient used for weighted averaging may be set to a real number that increases in the line-of-sight direction pertaining to a time close to the present.

The target position setting part 34 may use other methods in the clustering. The target position setting part 34 may perform, for example, hierarchical clustering, and classify the attention points. The hierarchical clustering is a method having each of the following steps (2a) to (2d). In (2a), the target position setting part 34 sets clusters each having one attention point as a member. In (2b), the target position setting part 34 integrates the clusters having a highest degree of similarity among the degrees of similarity between each cluster to form one cluster. In (2c), the target position setting part 34 ends the processing when the number of clusters becomes one, otherwise proceeds to the processing of (2d). In (2d), the target position setting part 34 calculates the degree of similarity between the cluster formed in the processing of (2b) and each of the other clusters, and returns to the processing of (2b). The hierarchical clustering is applicable even if the number of clusters is not known in advance. Hence, the degree of similarity between the clusters can be calculated regardless of the number of the attention points belonging to each cluster.

A hierarchical clustering method is, for example, a group average method. The group average method is as follows. In the hierarchical clustering, a degree of similarity between the attention points selected from each of every two clusters is calculated with respect to each of all the sets of attention points, and an average value of the calculated degree of similarity is determined as the degree of similarity between the two clusters. According to the group average method, a representative (for example, the center of gravity) of each cluster to be finally obtained can be acquired as a representative of the attention points. Since a clear set in which the attention points gather together is often formed in a specific region of high interest to the operator, a representative point determined with respect to the region can be used as the target position.

Among the classified clusters, the target position setting part 34 may reject a cluster in which the number of the attention points belonging to the cluster is less than a predetermined threshold number of attention points. Accordingly, even if the attention points are sparsely distributed in a region of low interest to the operator, a target position based on those attention points is removed. Hence, the target position that is likely to be a position of interest to the operator may remain.

Motion Control Processing

Figure 7:
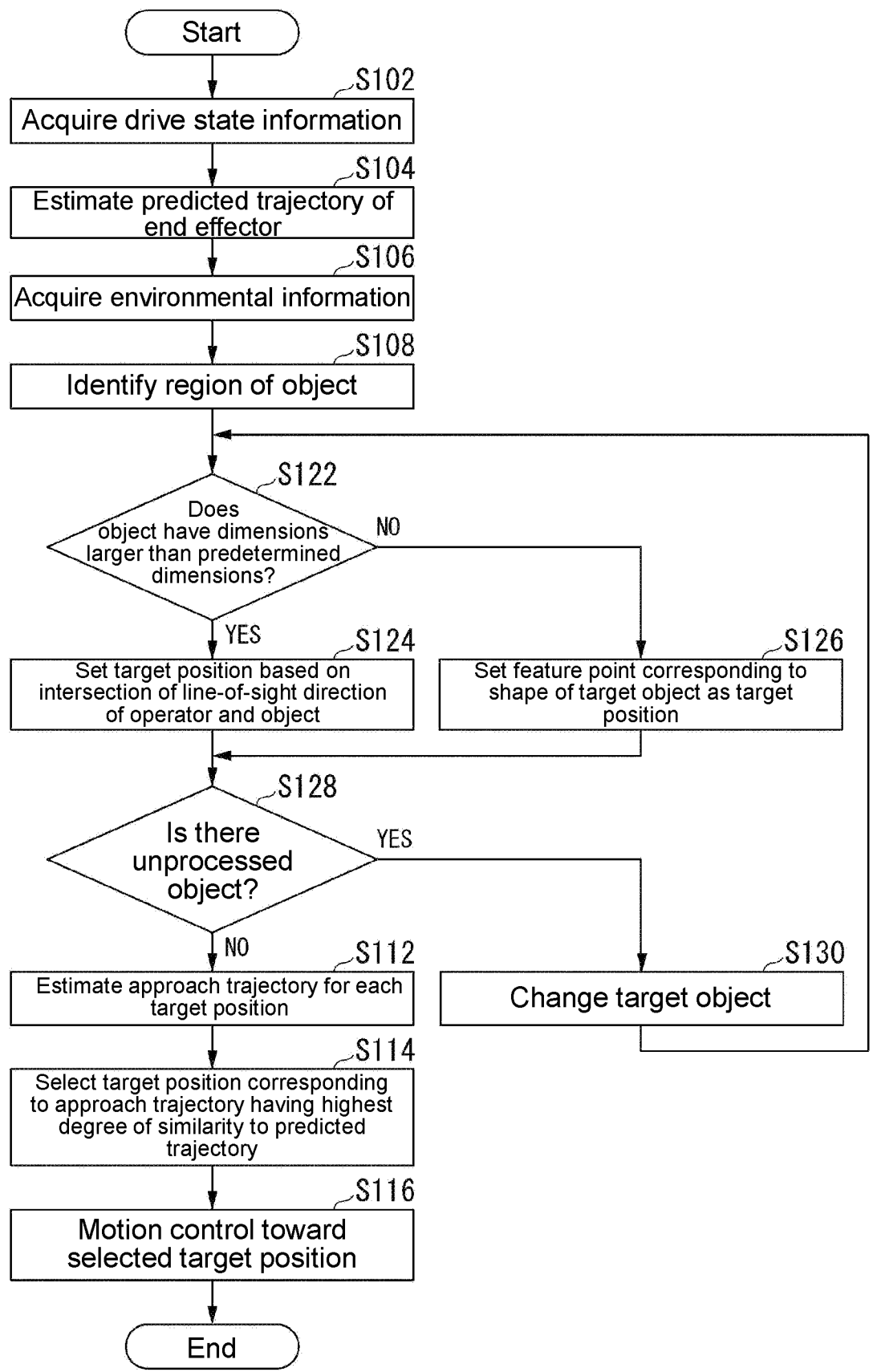
FIG. 7 is a flowchart illustrating an example of motion control processing according to the second embodiment.

Next, an example of motion control processing according to the present embodiment is described. FIG. 7 is a flowchart illustrating an example of motion control processing according to the present embodiment. The processing illustrated in FIG. 7 includes the processing of steps S102 to S108, S112 to S116, and S122 to S130.

The processing illustrated in FIG. 7 is proceeded to step S122 after the end of the processing of step S108.

(Step S122) The target position setting part 34 sets any detected object as a target object to be processed, and determines whether the target object has dimensions larger than the predetermined dimensions. When it is determined that the target object has larger dimensions (YES in step S122), the processing is proceeded to step S124. When it is determined that the target object does not have larger dimensions (NO in step S122), the processing is proceeded to step S126.

(Step S124) The target position setting part 34 determines an intersection of the line-of-sight direction at each time within a predetermined period up to the present indicated by the line-of-sight information and the target object as an attention point of the operator, and determines a representative point of coordinates of the determined attention point as a target position. After that, the processing is proceeded to step S128.

(Step S126) The target position setting part 34 determines a shape of the target object using the same method as in step S110, and sets a position of a feature point corresponding to the determined shape as the target position with reference to the object model data.

(Step S128) The target position setting part 34 determines whether an unprocessed object exists among the detected objects. If an unprocessed object exists (YES in step S128), the processing is proceeded to step S130. If no unprocessed object exists (NO in step S128), the target position setting part 34 proceeds to the processing of step S112.

(Step S130) The target position setting part 34 changes the target object to any one of unprocessed objects, and returns to the processing of step S122.

As described above, the control device 30 includes the target position setting part 34 that determines the target position of the end effector of the robot 20 based on the form of an object located in the operating environment of the robot 20. The control device 30 includes the trajectory estimation part 36 that estimates the predicted trajectory of the end effector based on motion of the end effector up to the present, and estimates the trajectory of the end effector from the current position to the target position as the approach trajectory using the predetermined function. The control device 30 includes the target position selector 38 that selects one target position based on the degree of similarity between the predicted trajectory and each of the approach trajectory.

According to this configuration, the approach trajectory to the target position is set based on the shape of the object in the operating environment of the robot 20, and the target position is selected based on the degree of similarity between the predicted trajectory estimated from the motion of the end effector and the approach trajectory. By guiding the end effector of the robot 20 to the target position where an intention of the operator is likely to be met, the operability of the robot 20 can be improved. Since such processing is based on the target position determined based on the motion of the end effector up to the present and the form of the object in the operating environment, it does not depend on the type of task. Hence, the disclosure is applicable to a scenario of approaching the object regardless of the type of task.

The target position setting part 34 may determine the shape of the object from the image indicating the operating environment, and may, based on the feature point data indicating an arrangement of feature points for each shape, determine the position of a feature point corresponding to the determined shape as the target position.

According to this configuration, the position of the feature point corresponding to the shape of the object determined from the image indicating the operating environment is determined as the target position. The end effector of the robot 20 can be guided by setting the position of a typical feature point as the target position according to the shape of the object.

The target position setting part 34 may reject the target position that interferes with another object.

According to this configuration, since invalid target positions that the end effector is unable to approach are removed, the end effector can be relatively reliably moved.

With respect to an object having dimensions larger than the predetermined dimensions, the target position setting part 34 may determine an intersection of a surface of the object and the line-of-sight direction of the operator based on the line-of-sight information indicating the line-of-sight direction, and may determine the target position based on a distribution of the intersection.

According to this configuration, a position gazed by the operator is determined as the target position. Therefore, even if the object is a large object in which a feature point cannot be uniquely determined, the motion of the end effector can be guided to an object of interest and a position of interest to the operator.

The target position setting part 34 may classify the intersection into multiple clusters, and may determine a representative point of the distribution of the intersection of each cluster as the target position.

According to this configuration, even if the position gazed by the operator is distributed in a discrete manner, the target position corresponding to each distribution is determined. By guiding the end effector of the robot 20 to a position of interest to the operator, the operability can be improved.

The embodiments of the disclosure have been described in detail above with reference to the drawings. However, the specific configuration is not limited to the above, and various design changes can be made without departing from the gist of the disclosure.

For example, in the environmental information acquisition part 80, the distance measurement part 84 may be integrated with the photographing part 82 to be configured as a three-dimensional image photographing part. The environmental information acquisition part 80 may include a multi-viewpoint photographing part in place of the photographing part 82 and the distance measurement part 84. The multi-viewpoint photographing part is a photographing part having multiple viewpoints and able to take an image for each viewpoint. The multi-viewpoint photographing part includes a so-called stereo camera. By an image (multi-viewpoint image) taken by the multi-viewpoint photographing part for each viewpoint, the operating environment of the robot 20 is three-dimensionally expressed. By analyzing the multi-viewpoint image, the target position setting part 34 is able to specify, from the operating environment of the robot 20, a region occupied by an object.

In the first embodiment, a part of or the whole of the display device 50 may be omitted.

In the second embodiment, a case is mainly described where the line-of-sight information indicates the line-of-sight direction of one eye (for example, left eye) of the operator. However, the disclosure is not limited thereto. The line-of-sight information may indicate the line-of-sight direction of each of the left eye and the right eye. If the line-of-sight direction of one eye is not available at a certain time (for example, during blinking), the target position setting part 34 may use the line-of-sight direction of the other eye when determining the attention point. If the line-of-sight directions of both eyes are available, the target position setting part 34 may determine an intersection where line segments in the line-of-sight directions of both eyes intersect or a midpoint of points of the line segments closest to each other as the attention point. Then, the target position setting part 34 may determine a direction from the head to the attention point to be a line-of-sight direction representing the line-of-sight directions of both eyes, and may determine an intersection of the determined line-of-sight direction and the surface of the object. The determined intersection is used in setting the target position.

The robot 20 may include multiple manipulators. The robot 20 may be a dual-arm robot having two manipulators. Each individual manipulator is able to operate in response to the motion of each one forearm and hand of the operator. For a dual-arm robot, for example, one and the other manipulators may respectively correspond to the left and right hands of one operator. Or, multiple manipulators may correspond to each one forearm and hand of multiple operators. The control device 30 may determine one target position for each manipulator using the above method and operate the manipulator toward the determined target position.

The target position setting part 34 may use a machine learning model when determining the region of each individual object from the operating environment of the robot 20. The target position setting part 34 may use a machine learning model when determining the shape of the determined region of the object and determining the target position according to the determined shape. The target position setting part 34 is able to use, for example, a neural network such as a convolutional neural network or a recurrent neural network. The target position setting part 34 may not only use a neural network and may use any other machine learning model such as a random forest.

The above description mainly describes a case where the target position setting part 34 identifies an object disposed in the operating environment of the robot 20 using the image data and the distance data sequentially acquired from the environmental information acquisition part 80 as the environmental information indicating the form of the object when estimating the target position. However, the disclosure is not limited thereto. For example, the target position setting part 34 may specify each individual object using, in place of or along with the image data and the distance data, object identification information indicating the object. As the object identification information, for example, radio frequency identification (RFID), may be used. The RFID may specify the form of each individual object, or may specify information indicating the type of the object, such as the product name and model number thereof. The target position setting part 34 is able to refer to an object type table indicating the form of each type of object in advance, and specify the form corresponding to the type of the object indicated by the RFID.

However, on a surface of each individual object provided in the operating environment of the robot 20, one or more RF tags are attached in advance as a transmitter transmitting a radio wave or an electromagnetic wave (hereinafter collectively referred to as "electromagnetic waves") carrying the RFID. The robot system S1 includes one or more RF readers as a detector detecting the electromagnetic waves transmitted from the RF tag. The RF reader transmits, as the object identification information, the RFID carried by the detected electromagnetic waves to the control device 30. The information acquisition part 32 stores the object identification information received from the RF tag in the storage 44, thereby making the object identification information available for use by the target position setting part 34.

The number of the RF reader provided in the robot system S1 may be three or more. In that case, for every two RF readers of the electromagnetic waves carrying common RFID from the three or more RF readers, based on a phase difference between them and a preset position of each individual RF reader, the target position setting part 34 is able to detect a position of the RF tag that issues the RFID as the position of the object. The number of the RF tag provided on the surface of one object may be two or more, and the target position setting part 34 may estimate the position of each individual RF tag. In the target position setting part 34, attachment position information indicating a position in the object where each individual RF tag is attached is set in advance, and the orientation of the object can be detected from the estimated positions of multiple RF tags. The target position setting part 34 is able to determine the target position as above based on the detected shape, position and orientation of the object without necessarily using the image data and the distance data.

The robot system S1 may include a simulator that synthesizes, in place of or along with the image data and the distance data, three-dimensional data representing the shapes, positions and orientations of various objects in a space in the operating environment of the robot 20 as the environmental information. The simulator may synthesize a three-dimensional image as the environmental information using a known computer graphics technique, or may acquire object information in which the shape, position and orientation of each individual object in the three-dimensional image are expressed by numerical values or symbols. The simulator transmits the synthesized or acquired environmental information to the control device 30. The information acquisition part 32 stores the object identification information received from the simulator in the storage 44, thereby making the object identification information available for use by the target position setting part 34. Accordingly, the robot system S1 is able to control the motion of the robot 20 without necessarily using an actually captured image or an actually measured distance. That is, the robot system S1 is applicable to the motion control in a virtual space simulating an operating environment or the motion control in an augmented reality space in which a virtual space is fused with an actual operating environment.

What is claimed is:

1. A control device, comprising:
a processor, configured to:
determine a plurality of target positions of an actor of a robot based on a form of an object located in an operating environment of the robot;
estimate a predicted trajectory of the actor based on motion of the actor up to the present, and estimating a trajectory of the actor from a current position respectively to each of the plurality of target positions as an approach trajectory using a predetermined function;
select one target position among the plurality of target positions based on a degree of similarity respectively between the predicted trajectory and each of the plurality of approach trajectories; and
control the actor of the robot to move toward the selected target position,
wherein with respect to the object having dimensions larger than predetermined dimensions, the processor further determines an intersection of a surface of the object and a line-of sight direction of an operator, classifies the intersection into a plurality of clusters, and determines a representative point of the distribution of the intersection of each of the plurality of clusters respectively as each of the plurality of target positions.

2. The control device according to claim 1, wherein the processor determines a shape of the object from an image indicating the operating environment, and, based on feature point data indicating an arrangement of feature points for each shape, determines positions of the feature points corresponding to the determined shape as the plurality of target positions.

3. The control device according to claim 2, wherein the processor rejects a target position, among the plurality of target positions, that interferes with another object.

4. A non-transitory computer-readable medium storing a program, the program causing a computer to function as the control device according to claim 1.

5. A robot system, comprising the control device according to claim 1 and the robot.

6. A control method in a control device, comprising:
determining a plurality of target positions of an actor of a robot based on a form of an object located in an operating environment of the robot;
estimating a predicted trajectory of the actor based on motion of the actor up to the present, and estimating a trajectory of the actor from a current position to each of the plurality of target positions as an approach trajectory using a predetermined function;
selecting one target position among the plurality of target positions based on a degree of similarity respectively between the predicted trajectory and each of the plurality of approach trajectories; and
controlling the actor of the robot to move toward the selected target position,
wherein with respect to the object having dimensions larger than predetermined dimensions, the method further comprising:
determining an intersection of a surface of the object and a line-of sight direction of an operator;
classifying the intersection into a plurality of clusters; and
determining a representative point of the distribution of the intersection of each of the plurality of clusters respectively as each of the plurality of target positions.

* * * * *